United States Patent [19]

Abel

[11] Patent Number: 4,692,752
[45] Date of Patent: Sep. 8, 1987

[54] MOISTURE DETECTOR

[75] Inventor: William E. Abel, Portland, Oreg.

[73] Assignee: Sentrol, Inc., Portland, Oreg.

[21] Appl. No.: 644,553

[22] Filed: Aug. 27, 1984

[51] Int. Cl.$^4$ ............................................. G08B 29/00
[52] U.S. Cl. .................................. 340/604; 340/508; 324/65 R
[58] Field of Search ............... 340/603, 604, 517, 521, 340/605, 620, 573, 508, 509, 511, 512; 250/551; 324/65 R

[56] References Cited

U.S. PATENT DOCUMENTS

| | | | |
|---|---|---|---|
| 3,487,404 | 12/1969 | Midkiff | 340/541 |
| 3,748,635 | 4/1973 | Phillips et al. | 340/59 |
| 3,914,753 | 10/1975 | Cho | 340/512 X |
| 4,010,458 | 3/1977 | Köpfli | 340/512 |
| 4,087,706 | 5/1978 | Koester, Jr. | 340/620 |
| 4,319,229 | 3/1982 | Kirkor | 340/517 |
| 4,422,066 | 12/1983 | Belcourt et al. | 340/517 |
| 4,465,998 | 8/1984 | Durand | 340/512 X |
| 4,514,722 | 4/1985 | Batcheler et al. | 340/604 |
| 4,586,028 | 4/1986 | McKinzie | 340/508 X |

FOREIGN PATENT DOCUMENTS 7835724 11/1980 France ................................. 340/512

Primary Examiner—Glen R. Swann, III
Assistant Examiner—Jeffery A. Hofsass
Attorney, Agent, or Firm—Chernoff, Vilhauer, McClung & Stenzel

[57] ABSTRACT

A moisture detector for detecting the presence of moisture between two electrodes includes an AC sensing network coupled to an indicator circuit by an opto-isolator to isolate impedances between the two circuits. The battery life of the detector is extending by a unique pulsing technique that creates current drain in the sensing circuit for only brief intervals of time. The pulsing technique enables the indicator circuit to keep an electronic switch in a closed-loop security system in an on state.

8 Claims, 4 Drawing Figures

MOISTURE DETECTOR

BACKGROUND OF THE INVENTION

The following invention relates to a moisture detector and in particular to a detector for use in a closed-loop security system having provision for isolating a sensing network from the remainder of the closed-loop security system and having means for prolonging the battery life of the battery powering the sensing network.

Moisture detectors for detecting leaks in pipes or conduits or for detecting flooding or moisture seeping into floors and carpets have been provided in the past by relatively simple circuits which measure the direct current conductivity between a pair of electrodes. Usually the electrodes are placed a predetermined distance apart in a region where moisture is to be sensed, and a DC potential is applied across the electrodes. When moisture is sensed, the current flow between the electrodes increases and the potential between the electrodes drops. This drop in potential may be sensed, and at a predetermined threshold point an alarm signal may be provided. The theory of operation of such devices is that the moisture provides a conductive path between the electrodes which varies from almost zero conductivity for a dry condition, to fairly high conductivity if the electrodes become immersed in water. Depending upon the particular application, a user might wish to set a threshold level of conductivity well short of total immersion. An example of such a simple moisture detector is shown in the June 1983 issue of "Computers and Electronics" in an article entitled "A Water-Leak Detector" by Mitchell Lee.

The DC circuit of the leak detector referred to above, and others of its class, is prone to several problems. First, because the circuit is a DC circuit with a DC current applied across the electrodes, an electrolysis effect takes place in the presence of moisture where conductivity between the electrodes yields a voltage which is above threshold. The electrolysis tends to build up oxides on the electrodes which cause a "battery effect". The "battery" created by the electrodes creates its own current flowing between the electrodes which adds algebraicly to the true conductivity resulting from the moisture. Moreover, the build-up of deposits along the electrodes increases the resistance path therebetween, thus rendering the device inaccurate.

A second problem is that the DC device produces a steady-state current drain which exhausts the battery driving it after a relatively short period of time, and also has a quiescent current drain which creates a finite impedance in the sensing portion of the circuit. This impedance may become coupled to the impedance in any external circuit to which the moisture detector is connected.

External circuits of the closed-loop type, that is, those circuits in which a break in the loop causes an alarm condition, also contain a quiescent current and a finite impedance. If the loop impedance is coupled to the sensor circuit impedance, however, the sensor voltage may be thereby affected, and, if the sensor circuit system is set to operate on a threshold voltage level, then the alarm in the closed-loop system could be triggered by the impedance coupling and not by any real moisture condition that has been sensed.

Some of these problems have been alleviated by the use of alternating current (AC) detection systems which use an oscillator for impressing an AC wave across a reactive circuit which includes a pair of moisture-detecting probes. The reactance of the AC circuit is dependent upon the conductivity between the two probes. When the reactance falls below a certain level, indicating a predetermined amount of conductivity, an alarm is generated. An example of such a device is a Sprague ULN-2429A fluid detector. With this device the potential across the electrodes alternates from positive to negative periodically and thus electrolysis and plating of the electrodes is prevented. However, the Sprague device is, like the DC device, electrically coupled between the sensor terminals and its external output circuit creating the possibility of false alarms because of differing external potential between the two circuits. This problem may likewise prevent the occurrence of a valid alarm.

What is needed, therefore, is a moisture sensing or similar condition sensing system having a low-current drain in its quiescent state thus providing for long battery life, and means for decoupling the quiescent current in the sensing network from any closed-loop system to which the sensing network may be coupled.

SUMMARY OF THE INVENTION

The present invention solves these problems by providing a means for isolating the sensing network from the remaining elements of the closed-loop system so that the quiescent current and the finite impedance resulting therefrom is not coupled into the remaining elements of the closed-loop system so as to alter the impedance of the sensing network. Moreover, the present system provides means for preventing the electrolysis of electrodes, and at the same time, through the use of a unique pulsing network, significantly reduces the current drain on the battery powering the sensing system.

The detector comprises two circuits, a sensing circuit and a indicator circuit. The indicator circuit is adapted to be coupled to a closed-loop security system. The term closed-loop security system as used herein shall be taken to mean a security system having a number of sensing and/or detecting networks connected in series in which an alarm indication occurs upon the opening of the loop. In a closed-loop system, the individual sensing or detecting networks normally maintain the loop in a closed-loop condition, that is, the loop maintains a predetermined amount of current flow therethrough in a quiescent condition. When a condition is sensed such as smoke by a smoke detector, the loop is opened at that point which serves to actuate an alarm or the like. Closed-loop security systems typically include a current source and a voltage threshold detector. Thus the loop has a finite impedance. When the impedance increases beyond a certain threshold point, the voltage level in the loop is sensed which may then trigger the alarm.

The moisture detector of the present invention includes a sensing circuit and an indicator circuit where the indicator circuit is coupled to the remaining elements of the closed-loop security system. The sensing circuit is isolated from the indicator circuit by an electronic optical isolation device so that any impedance coupling or potential difference between the sensing circuit and the indicating circuit is eliminated which would otherwise affect the potential across the sensors.

The sensing circuit is powered by a three-volt lithium battery which drives an oscillator having a period of two seconds (0.5 Hz). The oscillator is coupled to a reactive network which includes a pair of probes adapted to be placed in a region where moisture is to be sensed. The impedance of this network is proportional to the conductivity between the two probes. A voltage threshold detector is connected to the reactive network which provides an actuating signal whenever the potential at a predetermined point in the reactive network drops below a certain level. The oscillator is also connected in parallel with the reactive network to a delay network which delays the leading edge of each pulse from the oscillator for 12 milliseconds. The delay network is coupled to a slicing amplifier and differentiator for developing a 500 microsecond sampling pulse. The output of the diffentiator and the output of the threshold detector are combined in an AND gate which is, in turn, coupled to a light-emitting portion of an electronic optical isolation device. The coincidence of the 500 microsecond pulse and a "no moisture condition" output from the threshold detector causes a light-emitting diode (LED) in the optical device to turn on briefly once every two seconds. A light-sensitive element in the optical isolation device provides an output pulse each time the light turns on. This output side of the device is coupled to an indicator circuit which is adapted to maintain a MOSFET output switch in a closed-loop condition as long as the LED blinks every two seconds. If the LED stops blinking (indicating that a moisture condition has been sensed) a capacitor begins to ramp upwards until it reaches a threshold level in a threshold detector. If this level is reached and the LED does not begin blinking again with a predetermined period of time, the MOSFET output switch is opened and an oscillator in the indicator circuit is actuated, which causes a lamp to intermittently flash, indicating a moisture condition which is above the preset threshold level. When the MOSFET output switch opens, the loop in the closed-loop security system is opened and means may be provided at the front panel of this system for indicating an alarm condition.

The optical isolation device serves to prevent any potential differences or impedance coupling between the AC sensing network and the closed-loop security system from affecting the voltage sensed by the sensing circuit. The current drain on the battery in the sensing network is minimized by having the largest source of current drain, the LED, operative for only brief periodic intervals (500 microseconds) to maintain the MOSFET output switch in its closed condition.

A principal object of this invention is to provide a condition-sensing circuit for connection to a closed-loop security system which isolates the impedance of the sensor from the closed-loop system and which has an extremely low current drain.

A further object of this invention is to provide a moisture detector having low current drain which avoids the problem of electrolysis.

Yet a further object of this invention is to provide a pulse sampling means for a sensor circuit which may be utilized to couple the sensing circuit to an indicator circuit by means of an optical coupling device where the optical coupling device provides very low current drain for the sensing circuit.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 4:
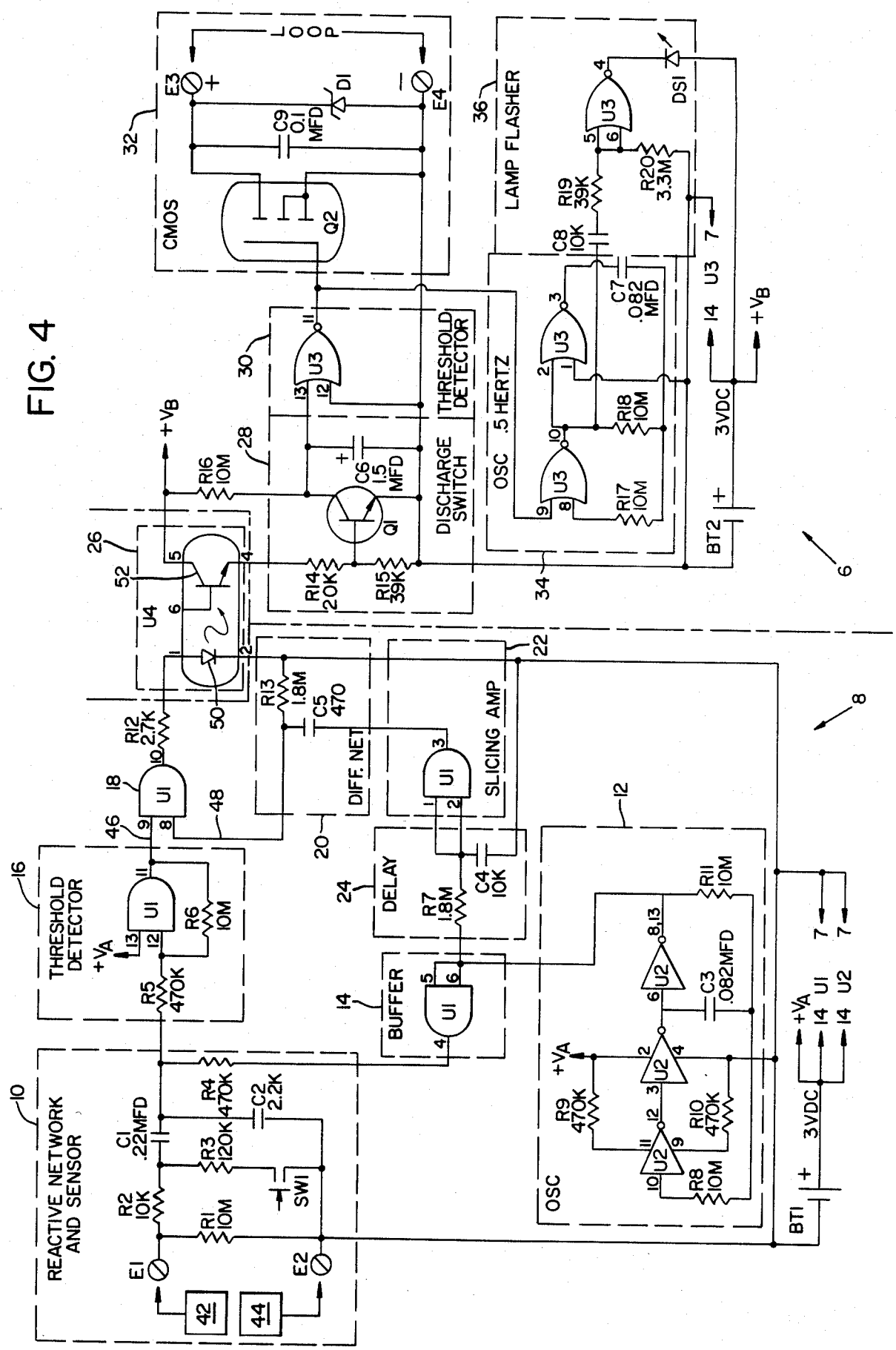
FIG. 4 is a full schematic diagram of the moisture detector of FIG. 1.

A moisture detector comprises a reactive network and sensor 10 which is driven by a one-half Hz oscillator 12 by way of a buffer amplifier 14. Connected to the output of the reactive network in sensor 10 is a threshold detector 16 which forms a first input to AND gate 18. Forming the second input to AND gate 18 is a differentiator network 20 coupled in series to a slicing amplifier 22 which is in turn connected to a delay network 24. Delay network 24 is connected to oscillator 12 in parallel with buffer amplifier 14. The output of AND gate 18 is connected the input of opto-isolator 26. The output of the isolator 26 is connected to a discharge switch 28 which is in turn coupled to a threshold detector 30. The output of the threshold detector forms the input to CMOS output switch 32. Connected in parallel with CMOS output switch 32 is an oscillator 34 which drives a lamp flasher 36. The oscillator is powered by battery BT2. The opto-isolator 26 includes a light-emitting element 50 and a light-sensitive element 52 (FIG. 4). The light-emitting element 50 is the primary amount of current drain for the sensing network 8 which comprises every component to the left of the dash-dot line in FIG. 4. This network is driven by three-volt battery BT1.

Figure 1:
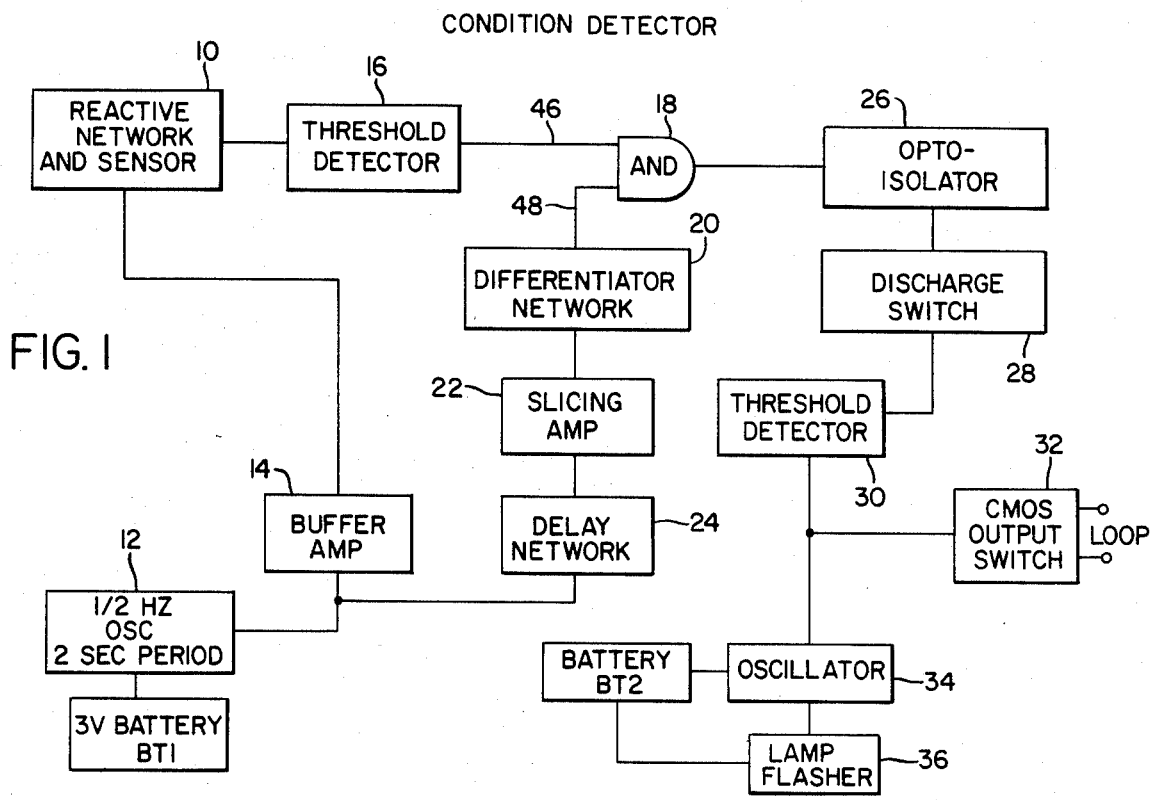
FIG. 1 is a block diagram of a moisture detector for connection to a closed-loop security system.
Figure 2:
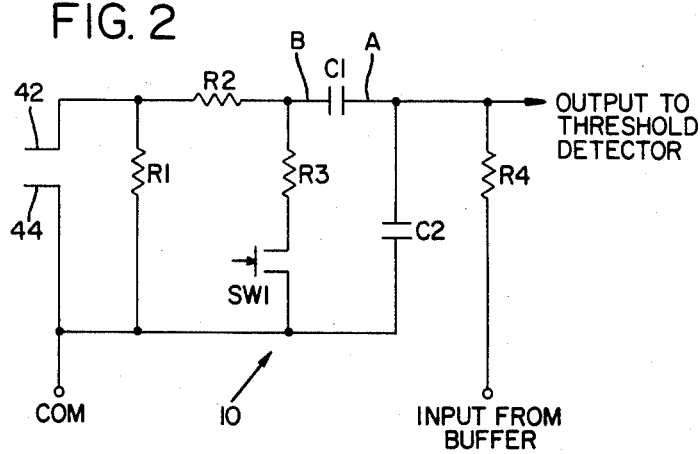
FIG. 2 is a schematic diagram of the reactive network and sensor portion of FIG. 1.

The reactive network and sensor 10 is shown in more detail in FIG. 2. In FIG. 2, a pair of sensing electrodes 42 and 44 are coupled to the input from buffer amp 14 via a reactive network consisting of R1, R2, C1, C2 and R4. Resistor R3 and push-button switch SW1 represents a test circuit which simulates a condition of moisture between electrodes 42 and 44.

Electrodes 42 and 44 are placed a predetermined distance apart in a region where moisture is to be sensed. When no moisture is present, the impedance across electrodes 42 and 44 will be nearly infinite. Moisture appearing between the electrodes, however, will give rise to a finite impedance allowing current to flow between the electrodes. The current between electrodes 42 and 44 is an alternating current.

Figure 3:
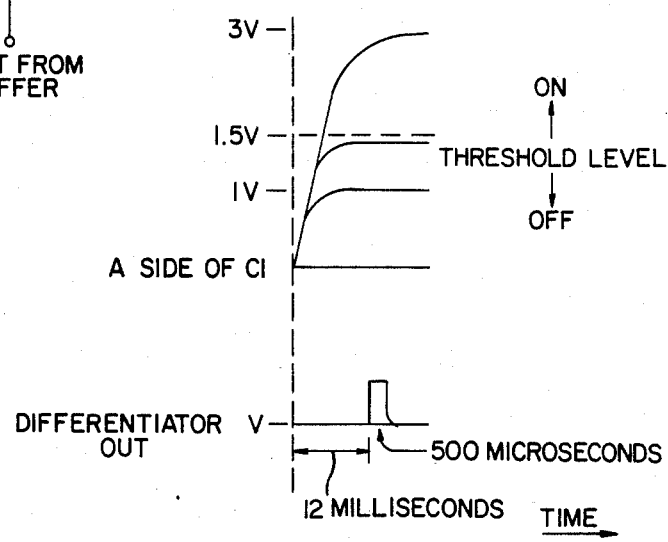
FIG. 3 is a wave form diagram illustrating the operation of the moisture detector of FIG. 1.

The output of buffer amplifier 14 approximates a square wave which is rounded slightly by capacitor C2 and resistor R4 as well as the capacitance between electrodes 42 and 44. As shown in FIG. 3, the voltage on the "A" side of capacitor C1 rises rapidly to a knee in its response curve where the slope changes and advances more gradually towards a three-volt level. The voltage level at which the slope changes depends upon the impedance across electrodes 42 and 44. The other or "B" side of capacitor C1 rises to a level determined by the combined resistance of R1 and the resistance between electrodes 42 and 44 which in conjunction with R4 form a voltage divider. At the peak of this wave, R1 and electrodes 42 and 44 no longer function as a voltage divider and begin to discharge C1 towards ground potential. R1 is a 10 megohm resistor. When the resistance between electrodes 42 and 44 is infinite, R1 forms the sole resistive element of the voltage divider. Thus, the potential on the "A" side of C1 advances rapidly towards approximately 2.85 volts on the leading edge of each pulse from oscillator 12. On the other hand, if the resistance between electrodes 42 and 44 is, for example, on the order of 500K ohms, the potential at "A" will rise rapidly to 1.5 volts. Similarly, if the resistance is even lower, for example 250K ohms, this potential will rise rapidly to 1 volt before the flex point of the potential curve at "A."

The point at which the slope of the curves on the "A" side of C1 changes occurs approximately 8 milliseconds after the leading edge of the pulse. Shortly thereafter at 12 milliseconds the potential on the "A" side of C1 is sampled. The sampling is performed by AND gate 18 which is coupled to differentiator network 20, slicing amplifier 22 and delay network 24.

A 0.5 Hz pulse from oscillator 12 is delayed in delay network 24 comprising R7 and C4 by approximately 12 milliseconds. R7 and C4 form an integrator which integrates the square wave output of oscillator 12. The output of delay network 24 drives a slicing amplifier 22 which produces a square wave which is differentiated by differentiator network 20 comprising C5 and R13 to yield a 500 microsecond pulse which occurs 12 milliseconds after the initiation of each square wave from oscillator 12. As shown in the top curve of FIG. 3, the threshold detector 16 is "on" as long as the potential on the "A" side of C1 is above a predetermined threshold value. In FIG. 3 that value has arbitrarily been chosen to be slightly lower than 1.5 volts, but could be any value selected by the user. Thus line 46 which forms a first input to AND gate 18 is periodically high when not enough moisture is present. Similarly, if the voltage on the "A" side of C1 is less than the threshold level, as when moisture is present, threshold detector 16 will be "off" and line 46 will be low.

Line 48 which forms a second input to AND gate 18 is low except in the presence of the 500 microsecond pulse shown at the bottom of FIG. 3, which is the output of differentiator network 20. Therefore, in the absence of a moisture condition, the output line 46 of threshold detector 16 will be "high" in coincidence with the occurrence of the 500 microsecond pulse from differentiator network 20 on line 48. Since this condition normally occurs every two seconds, the output of AND gate 18 goes high for 500 microseconds and drives the light-emitting element 50 of opto-isolator element 26. In summary, therefore, the light-emitting element 50 of opto-isolator 26 blinks briefly once every two seconds in the absence of a moisture condition sufficient to lower the impedance of reactive network and sensor 10 so as to make its voltage output lower than the trigger level of threshold detector 16. On the other hand, if threshold detector 16 has not reached the trigger level by the time that the 500 microsecond pulse appears on line 48, the output of and gate 18 remains low and light-emitting element 50 does not blink during that two-second period.

The circuitry to the right of the dashed-dot in FIG. 4 comprises indicator circuit 6. When light-emitting element 50 flashes, the flash is sensed by photosensitive element 52 which provides an input pulse to Q1. This causes Q1 to discharge to ground any charge that may have accumulated on capacitor C6. This keeps the input to threshold detector 30 low. Threshold detector 30 comprises pins 12, 13 and 11 of a NOR gate which is a portion of a NOR gate array U3. As long as either pin 13 or 12 is low, the output of the NOR gate on pin 11 will be high. This maintains CMOS Q2 which is a portion of CMOS output switch circuit 32 in an active or on state so that current flows in the loop between output contacts E3 and E4.

C6 is connected through resistor R16 to voltage supply plus VB which is the plus output of battery BT2. If C6 is not periodically discharged, its voltage rises towards three volts at which time pin 13 in threshold detector 30 goes high and the output on pin 11 goes low tunring Q2 off and thus opening the loop. The output of threshold detector 30 is also connected to oscillator 34 which is in turn connected to lamp flasher 36. When pin 11 goes low, turning Q2 off, oscillator 36 is activated which causes an LED DS1 to flash once every two seconds. Thus the indicator circuit 6 provides for a local indication that a moisture condition has been sensed as well as whatever alarm or indication is provided as a part of the remainder of the closed-loop security system.

The table of values listed below provides identification of the components shown in FIG. 4.

| Symbol | Description | Manufacturer |
|---|---|---|
| U$_1$ | 4081B IC | Motorola |
| U$_2$ | 4007UB IC | Motorola |
| U$_3$ | 4001UB IC | Motorola |
| U$_4$ | 4N36 Opto-Coupler IC | Litronix |
| Q$_1$ | 2N5089 Transistor SD117 | Motorola |
| Q$_2$ | SD1117 Power Mosfet | Semi Processes Inc. |
| D$_1$ | 1N5257B 33V Zener | Motorola |
| DS$_1$ | T-1-¾ Red Led Ultra-Bright | Hewlett-Packard |
| BT$_{1,2}$ | Lithium Battery PCB Pins | Panasonic |
| C$_1$ | 0.22 MFD 10% Mylar Cap. | |
| C$_2$ | 2,200 PFD, 10% X7R, Monolythic Ceramic | |
| C$_{3,7}$ | .082 MFD, 10% X7R, Monolythic Ceramic | |
| C$_{4,8}$ | 10K PFD, 10% X7R, Monolythic Ceramic | |
| C$_5$ | 470 PFD, 10% COG, Monolythic Ceramic | |
| C$_6$ | 1.5 MFD, 10% 35V Axial Tantulum Cap. | |
| C$_9$ | 100K PFD, 20% 25U, Monolythic Ceramic | |
| R$_{1,6,8,11,16,17,18}$ | 10 megohm, 5% | |
| R$_2$ | 10K ohm, 5% | |
| R$_3$ | 120K ohm, 5% | |
| R$_{4,5,9,10}$ | 470K ohm, 5% | |
| R$_{7,13}$ | 1.8 megohm, 5% | |
| R$_{12}$ | 2.7K ohm, 5% | |
| R$_{14}$ | 20K ohm, 5% | |
| R$_{15,19}$ | 39K ohm, 5% | |

Through the utilization of opto-isolator 26, the sensing circuit 8 is isolated from the indicator circuit 6. If the senosr network were directly coupled to the indicator network, the voltage in the sensing network would be affected by any such impedance coupling. As a means for isolating the sensing network from the indicator circuit, the opto-isolator 26 is the preferred method. However, other methods including mechanical relays could be utilized, it being understood that the primary goal in such a design is to isolate the impedance in the sensing network from the impedance in the indicating circuit, and hence from the remainder of the closed-loop system.

While an LED in an opto-isolator such as device 26 is useful for isolating impedances as described above, such a device inherently contains current requirements which could prematurely deplete any source of stored electrical energy such as a battery. Detecting systems of the type described herein frequently require the use of batteries as a power source because it is undesirable to have a security system dependent upon the building source of 60-cycle AC current. Obviously if the AC power supply is disabled, the security system would likewise be disabled. This is an additional reason why a local indicator such as provided by lamp flasher 36 driven by oscillator 34, is provided. These components operate solely off the battery of power supply BT2. Thus, even if the closed-loop security system were disabled, a check of the local indicator, that is, the place where lamp flasher 36 is mounted for observation, would reveal the existence of a moisture condition.

It should be noted that the system described above is not limited to sensing circuits for sensing a moisture condition. For example, the reactive network and sensor 10 of sensing circuit 8 could be adapted to operate as a smoke detector where the reactance of the reactive network and sensor 10 could depend upon the density of smoke between photocell and a light-emitting device. Similarly noise, stress, heat or any other physical parameter which may be made to affect the reactance in an electrical network, may be detected through the use of the present invention.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A moisture detector detecting the presence of moisture in a region to be tested comprising:
   (a) a pair of electrically conductive members disposed within said region;
   (b) a reactive network including said pair of electrically conductive members;
   (c) oscillator means for producing an alternating current signal having a predetermined period, said signal being coupled to said reactive network;
   (d) threshold detection means responsive to said reactive network for providing a periodic output signal as long as the conductivity between said electrically codnuctive members stays below a predetermined level;
   (e) pulse circuit means connected to said oscillator means for developing a delayed sampling pulse from the output of said oscillator means;
   (f) gate means responsive to both an output of said threshold detection means and said delayed sampling pulse for producing a periodic maintenance pulse;
   (g) electrically isolating means responsive to said periodic enabling signal for generating an alarm control signal; and
   (h) alarm means responsive to said alarm control signal for remaining in a non-alarm state when the moisture level within said region remains below a predetermined threshold but switching to an alarm state after a predetermined time period in the absence of said alarm control signal.

2. The moisture detector of claim 1 wherein said pulse circuit means includes delay means respnsive to said alternating current signal for timing the occurrence of said sampling pulse such that said sample pulse samples the voltage at a predetermined point in said reactive network at a time when the voltage response of said network to said alternating current signal has approached a maximum at said predetermined point.

3. The moisture detector of claim 2 wherein said electrically isolating means comprises an opto-isolator and said alarm means comprises a closed-loop security system.

4. The moisture detector of claim 3 wherein said alarm means further comprises:
   (a) a capacitor connected to a source of electrical current;
   (b) discharge switch means responsive to said alarm control signal for discharging said capacitor;
   (c) threshold detector means connected across said capacitor for generating a bias control control signal as long as a charge on said capacitor remains below a predetermined level; and
   (d) MOSFET switch means connected to said closed-loop security system, said MOSET switch means remaining in a conductive state in response to said bias control signal but switching to a nonconductive state in the absence of said bias control signal.

5. The moisture detector of claim 4 wherein said alarm means further comprises:
   (a) indicator oscillator means responsive to said bias control signal for producing a pulsed output signal in the absence of said bias control signal; and
   (b) lamp flasher means connected to said indicator oscillator means for producing a visual flashing signal in response to said pulsed output signal.

6. A sensor network for connection to a closed-loop security system comprising:
   (a) a battery-powered sensor circuit for detecting a predetermined physical parameter and for providing periodic output pulses of relatively short duration as long as said physical parameter remains undetected, including:
      (i) a reactive network including a sensor which changes the reactance of said network as a function of the physical parameter detected;
      (ii) oscillator means for producing an alternating current signal which is coupled to said reactive network;
      (iii) threshold detection means responsive to said reactive network for providing a periodic output as long as a sensed parameter of said reactive network remains above a predetermined threshold;
      (iv) pulse circuit means connected to said oscillator means for developing a delayed sampling pulse from the output of said oscillator means; and (v) gate means responsive to both an output of said threshold detection means and said delayed sampling pulse for producing periodic maintenance pulses;
(b) MOSFET switch means connected to said closed-loop security system, said MOSFET switch means having a non-alarm condition providing a conductive path in said closed-loop security system; and
(c) isolation circuit means responsive to said periodic maintenance pulses for providing a signal to maintain said MOSFET switch means in said non-alarm condition, and for electrically isolating said closed-loop security system from said battery-powered sensor circuit 7. The sensor network of claim 6 wherein said isolation circuit means comprises an opto-isolator.

8. The sensor network of claim 6 wherein the output of said opto-isolator means comprises a series of periodic pulses and further including discharge switch means responsive to said periodic pulses for providing a steady state signal to said MOSFET switch to keep said MOSFET switch in said first operative condition.

* * * * *

UNITED STATES PATENT AND TRADEMARK OFFICE
CERTIFICATE OF CORRECTION

PATENT NO. : 4,692,752

DATED : September 8, 1987

INVENTOR(S) : William E. Abel

It is certified that error appears in the above-identified patent and that said Letters Patent is hereby corrected as shown below:

| | |
|---|---|
| Col. 3, line 17 | Change "diffentiator" to --differentiator-- |
| Col. 6, line 14 | Change "tunring" to --turning-- |
| Col. 7, line 50 | After "detector" insert --for-- |
| Col. 7, line 62 | Change "codnuctive" to --conductive-- |
| Col. 8, line 13 | Change "respnsive" to --responsive-- |
| Col. 8, line 32 | After "control" delete --control-- |

Signed and Sealed this

Twenty-third Day of August, 1988

Attest:

DONALD J. QUIGG

*Attesting Officer*          *Commissioner of Patents and Trademarks*